(12) United States Patent
Kajino et al.

(10) Patent No.: US 7,289,010 B2
(45) Date of Patent: Oct. 30, 2007

(54) MN-ZN BASED FERRITE MEMBER

(75) Inventors: Takashi Kajino, Tokyo (JP); Kenya Takagawa, Tokyo (JP); Taku Murase, Tokyo (JP); Takuya Aoki, Tokyo (JP)

(73) Assignee: TDK Corporation, Tokyo (JP)

( * ) Notice: Subject to any disclaimer, the term of this patent is extended or adjusted under 35 U.S.C. 154(b) by 370 days.

(21) Appl. No.: 11/112,759

(22) Filed: Apr. 21, 2005

(65) Prior Publication Data

US 2005/0238904 A1 Oct. 27, 2005

(30) Foreign Application Priority Data

Apr. 21, 2004 (JP) .............................. 2004-125887

(51) Int. Cl.
*H01F 7/02* (2006.01)

(52) U.S. Cl. ...................... 335/302; 335/296
(58) Field of Classification Search ........ 335/302–306, 335/296
See application file for complete search history.

(56) References Cited

U.S. PATENT DOCUMENTS

| | | | |
|---|---|---|---|
| 5,498,361 A | * | 3/1996 | Matsukawa et al. ..... 252/62.62 |
| 5,698,145 A | * | 12/1997 | Narutani et al. ............ 264/612 |
| 6,180,022 B1 | * | 1/2001 | Kobayashi et al. ....... 252/62.62 |
| 6,749,768 B2 | * | 6/2004 | Endo et al. ............... 252/62.63 |
| 6,991,742 B2 | * | 1/2006 | Ito et al. ..................... 335/296 |
| 7,169,319 B2 | * | 1/2007 | Takami et al. ........... 252/62.57 |

FOREIGN PATENT DOCUMENTS

| | | |
|---|---|---|
| JP | 61-159778 | 7/1986 |
| JP | 05-275225 | 10/1993 |
| JP | 05-335156 | 12/1993 |
| JP | 06-283357 | 10/1994 |
| JP | 06-295812 | 10/1994 |
| JP | 2000-133510 | 5/2000 |

* cited by examiner

*Primary Examiner*—Elvin Enad
*Assistant Examiner*—Bernard Rojas
(74) *Attorney, Agent, or Firm*—Hogan & Hartson LLP

(57) ABSTRACT

There is provided a Mn—Zn based ferrite member excellent in mass productivity, high in withstand voltage, low in loss and excellent in direct current superposition property. The Mn—Zn based ferrite member is provided with a surface layer portion having the properties that $\rho 5$ defined in the specification satisfies the relation that $\rho 5 \geqq 10^3$ $\Omega$m and $\rho 50$ defined in the specification satisfies the relation that $\rho 50 \leqq 10^2$ $\Omega$m.

$\rho 5$: $(R0-R1)S/L5$ ($\Omega$m)
$\rho 50$: $(R2-R3)S/L50$ ($\Omega$m)

7 Claims, 13 Drawing Sheets

MN-ZN BASED FERRITE MEMBER

BACKGROUND OF THE INVENTION

1. Field of the Invention

The present invention relates to a Mn—Zn based ferrite member to be suitably used as a core in a coil and as a core in a transformer, in particular, a Mn—Zn based ferrite member to be suitably used as a core for a small low-profile power coil and as a core for a small low-profile power transformer each displaying a low loss, a high withstand electric voltage (hereinafter referred to as withstand voltage) and excellent magnetic properties, and having high mass productivity.

2. Description of the Related Art

As the cores for small low-profile power devices, there have hitherto been used cores formed by using Ni—Zn ferrite, directly winding wire therearound and forming terminal electrodes, or cores formed by combining an insulating bobbin and Mn—Zn based ferrite. The former type permits downsizing but is large in loss and poor in magnetic properties, and has a problem such that the direct current superposition property is insufficient. On the other hand, the latter type is small in loss, excellent in magnetic properties, and permits, for example, forming a coil having an excellent direct current superposition property; however, this type has a small core resistance, which necessitates combinational use of an insulating bobbin, and thereby makes downsizing of this type difficult.

In view of the above described circumstances, various proposals have been made for cores excellent in magnetic properties, low in loss and permitting downsizing.

Among such proposals is Japanese Patent Publication No. 2-60073 (Patent Document 1) which discloses a technique to form a high electric resistance layer on the surface by oxidizing a Mn—Zn based ferrite having a particular composition in a high temperature oxidative atmosphere. However, the material composition of the Mn—Zn based ferrite in Patent Document 1 is such that ZnO: 14.6 to 29.8 mol % (10 to 20 wt %) and MnO: 17.1 to 33.4 mol % (10 to 20 wt %), namely, a high μ composition; the saturation magnetic flux density (Bs) and the direct current superposition property of the ferrite are poor.

Japanese Patent Laid-Open No. 6-295812 (Patent Document 2) also discloses a technique in which the surface of a Mn—Zn based ferrite ($Fe_2O_3$: 50 to 56 mol %, ZnO: 5 to 25 mol %, the balance being MnO (19 to 45 mol %)) is oxidized to form a high resistance layer. However, the Mn—Zn based ferrite member obtained in Patent Document 2 has a small surface layer resistance of the order of $1\times10^3$ Ωm, accordingly the withstand voltage being hardly made sufficient. In Patent Document 2, the oxidation treatment is carried out by introducing air in a temperature range between 700 and 400° C. in the cooling step after sintering. The cause for the insufficient development of the surface resistance may be understood that the introduction of air decreases the temperature of the atmosphere in the course of the oxidation treatment, thus preventing the oxidation from proceeding sufficiently.

Japanese Patent Laid-Open No. 5-275225 (Patent Document 3) also discloses a technique to form a high resistance layer by oxidizing the surface of a Mn—Zn based ferrite. In Patent Document 3, a press compacted body composed of the Mn—Zn based ferrite powder is sintered, and then the sintered body is subjected to the surface oxidation treatment in the air atmosphere at 600 to 800° C. In the Mn—Zn based ferrite core obtained in Patent Document 3, the oxidation proceeds to the interior of the sintered body in such a way that the resistance value at the depth of 50 μm from the surface is 10 or more times the resistance value at the depth of 200 μm from the surface; thus the withstand voltage is high, but the loss comes to increase drastically.

Japanese Patent No. 3108803 (Patent Document 4) discloses a method in which the volume resistivity of the whole core is increased by regulating additives in such a way that the Mn—Zn based ferrite composition has an iron-poor composition. Although this method can give a sufficient withstand voltage, the iron-poor composition drastically increases the loss, and moreover, degrades the magnetic properties so as to be equivalent to those of Ni—Zn based ferrite.

Japanese Patent Laid-Open No. 6-283357 (Patent Document 5) discloses a technique to form an inorganic high resistance coating film on the surface of a core, while Japanese Patent Laid-Open No. 5-335156 (Patent Document 6) discloses a technique to form an organic high resistance coating film on the surface of a core. These techniques each can decrease the core loss and can provide a high withstand voltage and high magnetic properties, but the step to form the coating film is cumbersome and these techniques are thereby poor in mass productivity.

[Patent Document 1] Japanese Patent Publication No. 2-60073.

[Patent Document 2] Japanese Patent Laid-Open No. 6-295812.

[Patent Document 3] Japanese Patent Laid-Open No. 5-275225.

[Patent Document 4] Japanese Patent No. 3108803.

[Patent Document 5] Japanese Patent Laid-Open No. 6-283357.

[Patent Document 6] Japanese Patent Laid-Open No. 5-335156.

SUMMARY OF THE INVENTION

The present invention was achieved on the basis of such technical problems as described above, and takes as its object the provision of a Mn—Zn based ferrite member excellent in mass productivity, high in withstand voltage, low in loss, and excellent in direct current superposition property and a core using the Mn—Zn based ferrite member.

The present inventors studied Mn—Zn based ferrite members having surface layer portions exhibiting various types of resistance behavior produced by use of an oxidation treatment excellent in mass productivity, and revealed that sufficient withstand voltage can be obtained when the resistance of the Mn—Zn based ferrite member at a depth of about 50 μm from the surface is sufficiently high, and the increase of the core loss can be avoided when the resistance in the further deeper portion is made small. More specifically, in the present invention, the above described problems have been solved by a Mn—Zn based ferrite member including a magnetic body formed of a Mn—Zn based ferrite sintered body and a surface layer portion formed on the surface area of the magnetic body and having the properties that ρ5 defined below satisfies the relation that $\rho5 \geq 10^3$ Ωm and ρ50 defined below satisfies the relation that $\rho50 \leq 10^2$ Ωm.

ρ5: (R0−R1)S/L5 (Ωm)

ρ50: (R2−R3)S/L50 (Ωm)

L5=10 μm;

L50=20 μm;

R0 (Ω): The resistance value between the electrode formed on the whole area of a first surface and the electrode formed on the whole area of a second surface of a measurement sample A (the sample A is a sample taken from the Mn—Zn based ferrite member; the sample A has the first surface and the second surface being parallel and opposed to each other, and the space between the first surface and the second surface forms a columnar body of a constant sectional area S (mm$^2$); the first surface is an outside exposed surface of the Mn—Zn based ferrite member and the second surface is a surface separated by 100 μm or more from the outside exposed surface in the Mn—Zn based ferrite member).

R1 (Ω): The resistance value between the electrode formed on the whole area of a polished surface formed by polishing away a 10 μm layer from the first surface of the measurement sample A and the electrode formed on the whole area of the second surface;

R2 (Ω): The resistance value between the electrode formed on the whole area of a polished surface formed by polishing away a 40 μm layer from the first surface of the measurement sample A and the electrode formed on the whole area of the second surface; and R3 (Ω): The resistance value between the electrode formed on the whole area of a polished surface formed by polishing away a 60 μm layer from the first surface of the measurement sample A and the electrode formed on the whole area of the second surface.

In the Mn—Zn based ferrite member of the present invention, the surface layer portion thereof preferably satisfies the relation that $\rho 5 \geq 300 \times \rho 50$, and more preferably the relations that $\rho 5 \geq 2 \times 10^3$ Ωm, $\rho 50 \leq 0.5 \times 10^2$ Ωm, and $\rho 5 \geq 500 \times \rho 50$. The Mn—Zn based ferrite member of the present invention provided with such resistance properties has a high withstand voltage, a low loss and an excellent direct current superposition property.

In the Mn—Zn based ferrite member of the present invention, the below defined R50 and R200 preferably satisfy the relations that R50≤15 kΩ and R50≤10×R200.

A measurement sample B: 10 mm×10 mm×10 mm (the sample B is a cubic sample taken from the Mn—Zn based ferrite member concerned).

R50: A resistance value to be obtained as follows: A 50 μm layer is polished away from a first surface of the measurement sample B, an electrode is formed on the whole area of a second surface opposite to the first surface, and the resistance value R50 is measured by contacting terminals each having a contact area of 1 mm$^2$ respectively to the center of the polished surface and the center of the electrode (the first surface in the measurement sample B is the outside exposed surface in the Mn—Zn based ferrite member).

R200: A resistance value to be obtained as follows: A 200 μm layer is polished away from the first surface of the measurement sample B, an electrode is formed on the whole area of the second surface opposite to the first surface, and the resistance value R200 is measured by contacting terminals each having a contact area of 1 mm$^2$ respectively to the center of the polished surface and the center of the electrode.

In the Mn—Zn based ferrite member of the present invention, the Mn—Zn based ferrite sintered body preferably includes the ZnO composition in a range of 14 mol % or less. This is because when the ZnO content exceeds 14 mol %, the saturation magnetic flux density (Bs) and the direct current super position property (Idc) are degraded appreciably.

In the Mn—Zn based ferrite member of the present invention, the Mn—Zn based ferrite sintered body preferably has a relative density of 96% or more. This is because when the relative density is less than 96%, oxidation develops down to a depth exceeding 50 μm or 100 μm to increase the resistance in the region of such a depth so that low loss can hardly be actualized.

As described above, the present invention can provide a Mn—Zn based ferrite member excellent in mass productivity, high in withstand voltage, low in loss, and excellent indirect current superposition property.

DETAILED DESCRIPTION OF THE PREFERRED EMBODIMENTS

The present invention will be described below in detail.

Figure 1:
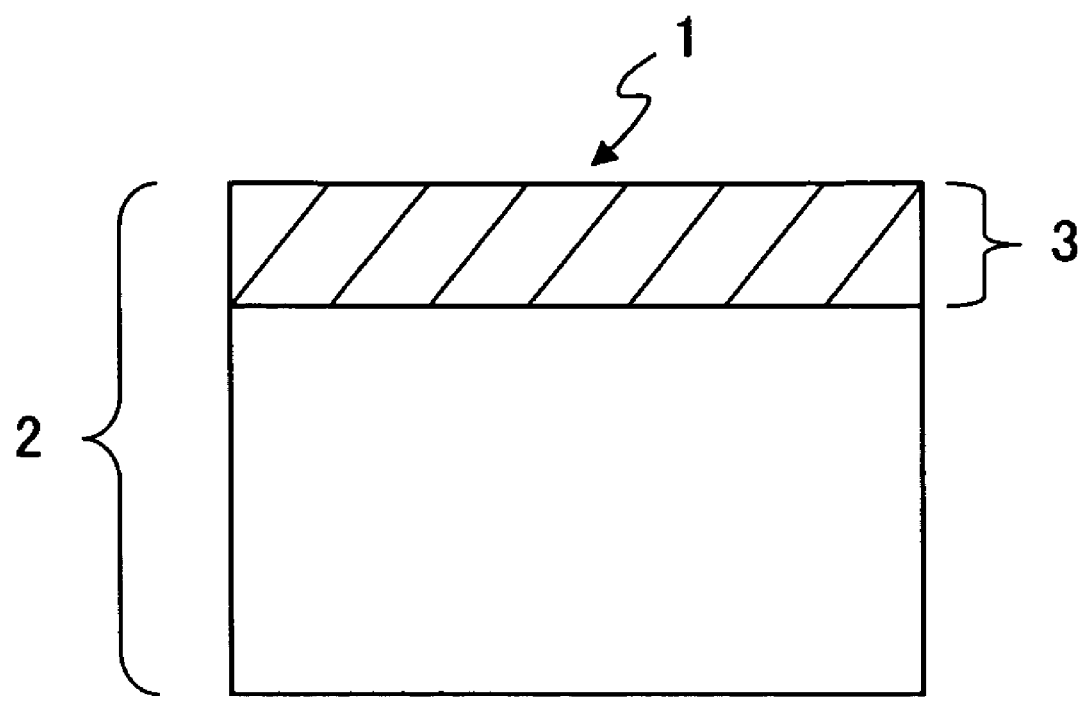
FIG. 1 is a schematic sectional view of a part of a Mn—Zn based ferrite member of the present invention.

As shown in FIG. 1, the Mn—Zn based ferrite member 1 of the present invention includes a magnetic body 2 formed of a Mn—Zn based ferrite sintered body and a surface layer portion 3 formed on the surface area of the magnetic body. The surface layer portion 3 is prepared by applying a below described annealing treatment to the magnetic body 2 and is different in oxidation condition from the magnetic body 2 exclusive of the surface layer portion 3.

Figure 2:
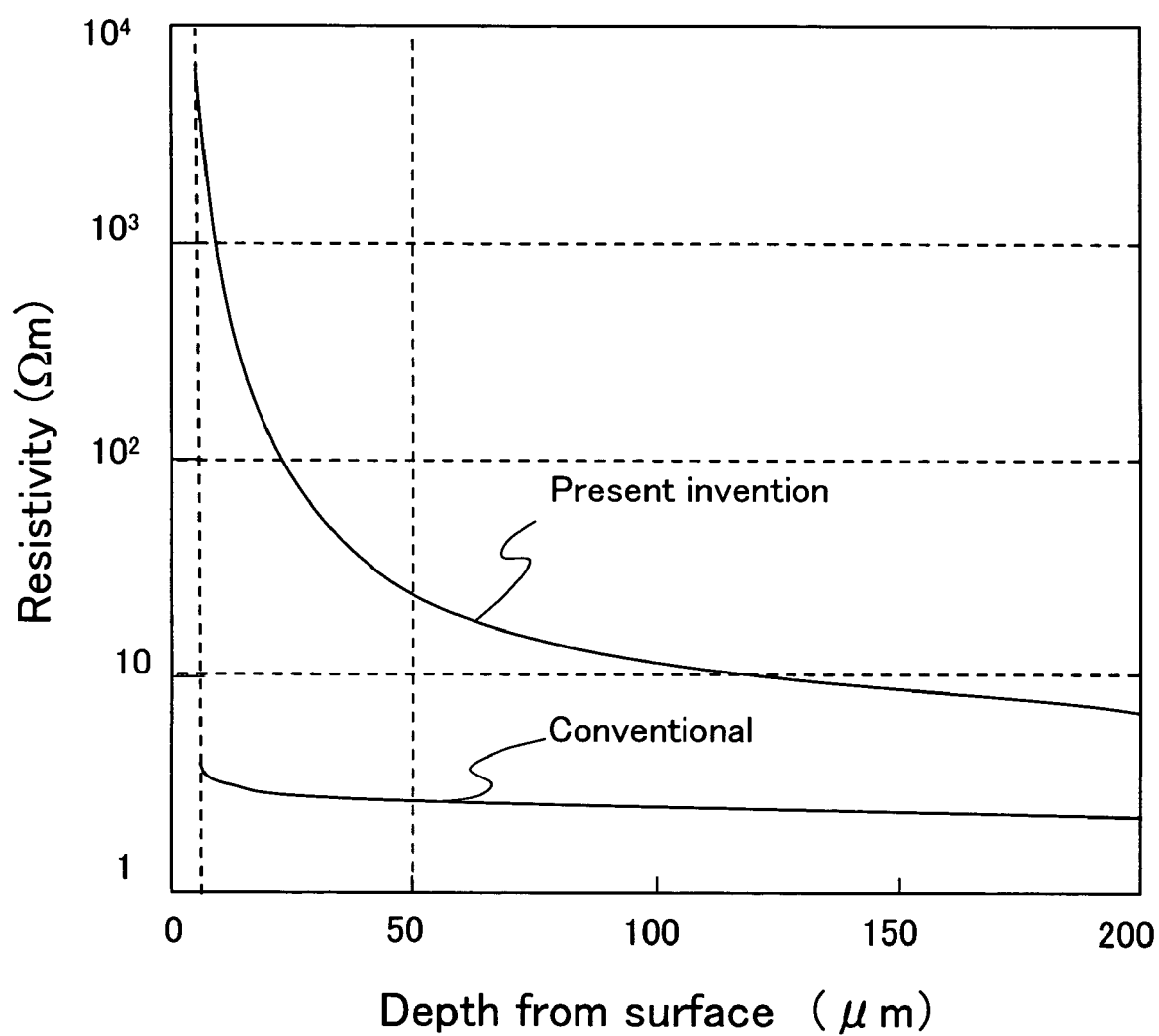
FIG. 2 is a graph schematically illustrating the relation between the resistivity of the surface layer portion and the position from the surface in the Mn—Zn based ferrite member of the present invention.

The surface layer portion 3 in the present invention has the properties that $\rho 5 \geq 10^3$ Ωm and $\rho 50 \leq 10^2$ Ωm. FIG. 2 is a graph schematically illustrating the relation between the resistivity of the surface layer portion and the depth from the surface in an example of the surface layer portion 3. In the surface layer portion 3 of the present invention, as shown in FIG. 2, the resistance is high on the surface and decreases sharply in the region between the surface and the depth of 50 μm from the surface. In the region deeper than 50 μm, the resistance varies moderately. FIG. 2 also shows the resistivity behavior of a conventional Mn—Zn based ferrite having a low surface resistivity in the vicinity of 10 Ωm. The Mn—Zn based ferrite member 1 according to the present invention, having the surface layer portion 3 like this, can actualize a high withstand voltage based on a very high resistance in the vicinity of the surface, and can actualize a low core loss based on the sharp decrease in resistance along the depth direction. The present invention makes it possible to form the surface layer portion 3 having the properties that ρ5 and ρ50 satisfy preferably the relations that $\rho 5 \geqq 2 \times 10^3$ Ωm and $\rho 50 \leqq 30$ Ωm, and more preferably the relations that $\rho 5 \geqq 4 \times 10^3$ Ωm and $\rho 50 \leqq 10$ Ωm.

The surface layer portion 3 of the present invention having these properties exhibits a sharp decrease in resistance in such a way that ρ5 and ρ50 satisfy the relation that $\rho 5/\rho 50 \geqq 300$, preferably the relation that $\rho 5/\rho 50 \geqq 500$, and more preferably the relation that $\rho 5/\rho 50 \geqq 700$.

The above described preferable surface layer portion 3 of the present invention can have the properties that R50 and R200 satisfy the relation that $R50 \leqq 10 \times R200$. This clearly shows the difference between Patent Document 3 specifying that $R50 \geqq 10 \times R200$ and the Mn—Zn based ferrite member of the present invention.

The method of obtaining the surface layer portion 3 of the present invention will be mentioned later together with the method of producing the Mn—Zn based ferrite member 1 to be described below.

No particular constraint is imposed on the composition of the Mn—Zn based ferrite member of the present invention; however, it is preferable that the ferrite member includes, as main constituents, 50 to 58 mol % of $Fe_2O_3$, 5 to 14 mol % of ZnO, and the balance substantially being MnO.

When the content of $Fe_2O_3$ is increased, the saturation magnetic flux density in the high temperature region is improved, while the core loss tends to be degraded. When the content of $Fe_2O_3$ is less than 50 mol %, the saturation magnetic flux density in the high temperature region is decreased. On the other hand, when the content of $Fe_2O_3$ exceeds 58 mol %, the increase of the core loss becomes remarkable. Accordingly, the content of $Fe_2O_3$ is set between 50 and 58 mol % in the present invention; the content of $Fe_2O_3$ is preferably 51 to 57 mol %, and more preferably 52 to 56 mol %.

The content of ZnO also affects the saturation magnetic flux density and the core loss. When the content of ZnO is less than 5 mol %, the saturation magnetic flux density is decreased and the loss is simultaneously increased. Also, when the content of ZnO exceeds 14 mol %, the saturation magnetic flux density is decreased and the loss is simultaneously increased. Accordingly, in the present invention, the content of ZnO is preferably set between 5 and 14 mol %, more preferably between 5 to 12 mol %, and furthermore preferably between 6 to 9 mol %.

The Mn—Zn based ferrite member of the present invention can contain additives to be described below in addition to the above described main constituents.

The Mn—Zn based ferrite member of the present invention may contain, as first additives, Si within a range of 250 ppm or less (not inclusive of 0) in terms of $SiO_2$ and Ca within a range of 2500 ppm or less (not inclusive of 0) in terms of $CaCO_3$. Si and Ca segregate on the grain boundary to form high resistance layers and thereby contribute to decreasing the loss. In addition, Si and Ca have as sintering agents an effect for improving the sintered body density.

The Mn—Zn based ferrite member of the present invention can contain, as second additives, one or more of $Nb_2O_5$: 400 ppm or less (not inclusive of 0), $ZrO_2$: 1000 ppm or less (not inclusive of 0), $Ta_2O_5$: 1000 ppm or less (not inclusive of 0), $In_2O_5$: 1000 ppm or less (not inclusive of 0), and $Ga_2O_5$: 1000 ppm or less (not inclusive of 0). Inclusion of these second additives can yield an effect such that the saturation magnetic flux density is improved and/or the loss is decreased.

The Mn—Zn based ferrite member of the present invention can contain, as third additives, one or two of $SnO_2$: 10000 ppm or less (not inclusive of 0) and $TiO_2$: 10000 ppm or less (not inclusive of 0). $SnO_2$ and $TiO_2$ are present inside the grains and in the grain boundary, and have an effect of decreasing loss.

The Mn—Zn based ferrite member of the present invention can contain, as fourth additives, one or more of a P compound: 35 ppm or less (not inclusive of 0) in terms of P, $MoO_3$: 1000 ppm or less (not inclusive of 0), $V_2O_5$: 1000 ppm or less (not inclusive of 0), $GeO_2$: 1000 ppm or less (not inclusive of 0), $Bi_2O_3$: 1000 ppm or less (not inclusive of 0), and $Sb_2O_3$: 3000 ppm or less (not inclusive of 0). The fourth additives have as sintering agents an effect of improving sintered body density and contribute to low temperature sintering.

Next, a method of producing the Mn—Zn based ferrite member of the present invention will be described below.

As raw materials used as main constituents, there are used powders of oxides or compounds to be converted into oxides by heating. More specifically, $Fe_2O_3$ powders, $Mn_3O_4$ powders, ZnO powders and according to need the additive powders can be used. The mean particle sizes of the respective powers may be selected as appropriate in a range between 0.1 and 3.0 μm.

After the raw material powders of the main constituents have been subjected to wet mixing, the mixture thus obtained is calcined. The calcination temperature may be selected to fall within a range between 800 and 1000° C. The calcination atmosphere may be $N_2$ or air. The stable calcination time may be selected as appropriate in a range between 0.5 and 5.0 hours. After calcining, the calcined powder is milled.

In the present invention, raw materials used as main constituents are not limited to those described above, but complex oxide powders containing two or more types of metals may be used as raw materials for main constituents. For example, an aqueous solution containing ferric chloride and manganese chloride is subjected to oxidizing roasting to obtain a complex oxide powder containing Fe and Mn. This complex oxide powder may be mixed with a ZnO powder to prepare a main constituent raw material. In this case, calcining is unnecessary.

Similarly, as raw materials used as additives, there can be used powders of oxides or compounds to be converted to oxides by heating. Specifically, there can be used $SiO_2$, $CaCO_3$, $Nb_2O_5$, $ZrO_2$, $Ta_2O_5$, $In_2O_5$, $Ga_2O_5$, $SnO_2$, $TiO_2$, $MoO_3$, $V_2O_5$, $GeO_2$, $Bi_2O_3$, $Sb_2O_3$ and the like. When a P compound is selected as a fourth additive, a powder yielding the P compound by heating, for example, a $Ca_3(PO_4)_2$ powder or the like can be used. Raw material powders used as these additives are mixed with powders of main constituents milled after calcining. Alternatively, after raw material powders used as additives and raw material powders used as main constituents have been mixed together, the raw material powders used as additives may be subjected to calcining together with the main constituents.

A mixed powder comprising main constituents and additives added according to need is granulated to smoothly carry out the following compacting step. Granulation can be carried out by use of, for example, a spray dryer. A suitable binder such as polyvinyl alcohol (PVA) is added in a small amount to the mixed powder, and the mixture is then sprayed and dried with a spray dryer. The granules thus obtained are preferably approximately between 80 and 200 μm in mean particle size.

The obtained granules are compacted into a desired form, for example, by using a press equipped with a die with a certain shape. The obtained compacted body is then sintered in the sintering step.

In the sintering step, the temperature is retained within a range between 1250 to 1450° C. for about 2 to 10 hours. The atmosphere (sintering atmosphere) in the sintering step is such that the partial pressure of oxygen is less than 8%, preferably 3 to 6%, and more preferably 5 to 6%. It may be noted that a nitrogen atmosphere is used for the temperature increasing process to reach the range between 1250 to 1450° C., and for the temperature decreasing process from the temperature ranged concerned.

In the present invention, it is important that the density of a sintered body (sintered body density) is 96% or more. When the sintered body density is less than 96%, a sharp decrease of the resistance from the surface toward the interior cannot be actualized and no improvement of the core loss can be achieved. The sintered body density is preferably 96.5% or more, and more preferably 97% or more. For the purpose of obtaining a sintered body density of 96% or more, the density of the compacted body (compact density) and the sintering conditions can be regulated. If the compact density is too low, a sintered body density of 96% or more cannot be obtained even when the sintering temperature is increased. Example 5 to be described later may provide a guideline for the compact density and sintering temperature to obtain a sintered body density of 96% or more.

In the present invention, an annealing treatment is carried out after sintering. The annealing treatment is a factor necessary for obtaining a surface layer portion having the aforementioned resistance properties. The annealing treatment can be carried out by retaining the sintered body for a predetermined time in an oxidative atmosphere, typically in the air at a predetermined temperature. The annealing treatment is preferably conducted at a temperature between 650 and 850° C. When the temperature is lower than 650° C., the relation that $\rho 5 \geq 10^3$ Ωm cannot be satisfied and the withstand voltage of the obtained Mn—Zn based ferrite member is insufficient. On the other hand, when higher than 850° C., the resistance in the interior of the sintered body, specifically, in the region deeper than 50 μm from the surface is increased to increase the core loss. The annealing temperature more preferably falls within the range between 700 to 800° C. The retention time in the annealing treatment can be selected as appropriate between 0.5 to 10 hours, according to the temperature.

The annealing treatment can be conducted after obtaining the sintered body as a step separated from the sintering, and also can be conducted in the temperature decreasing process of the sintering. In the former case, the sintered body cooled down within the sintering furnace to a predetermined temperature is placed into a heat treatment furnace for the annealing treatment and can be retained under heating at a predetermined temperature for a predetermined time. In the latter case, a needed amount of oxygen can be introduced at the annealing temperature in the temperature decreasing process while the temperature is being maintained.

A core using the above described Mn—Zn based ferrite member of the present invention can attain a core loss (Pcv) of 600 kW/m³ or less, preferably 550 kW/m³ or less and more preferably 500 kW/m³ or less under the conditions of 100 kHz and 200 mT; a withstand voltage of 50 V or more, preferably 60 V or more and more preferably 70 V or more; and a direct current superposition property better than those of the Ni—Zn based ferrite. No particular constraint is imposed on the form of the core using the Mn—Zn based ferrite member of the present invention, and the Mn—Zn based ferrite member can be applied to any forms of cores well known in the art. Additionally, the core is preferably used for small low-profile power coils and transformers, and can be used, needless to say, for other purposes.

EXAMPLE 1

As the ferrite raw materials, a $Fe_2O_3$ powder: 54 mol %, a MnO powder: 39.5 mol % and a ZnO powder: 6.5 mol % were prepared and subjected to wet mixing, and then the mixture was calcined at 850° C. for 3 hours. Next, the calcined substance was milled and the powder thus obtained was added with a binder. The mixture thus obtained was subjected to granulation and compacting to obtain a compacted body.

The obtained compacted body was sintered. The sintering was carried out under the conditions that the temperature was increased up to 1300° C. in a nitrogen atmosphere, then the oxygen partial pressure was regulated at 3% over a period of 5 hours, and thereafter the temperature was decreased in a nitrogen atmosphere. The density, saturation magnetic flux density Bs, and permeability μ of the thus obtained sintered body were measured to be 4.93 g/cm³ (relative density: 97.3%), 540 mT and 2400, respectively.

Next, φ15 mm×10 mm cylindrical sintered bodies were subjected to annealing treatments at different retention temperatures and for different times. The resistance of each of the annealed sintered bodies was measured as described below. The measurement process will be described below. A 100 μm layer was polished away from any one of the two opposite parallel surfaces of the cylindrical sintered body subjected to oxidation treatment. The cylindrical sintered body subjected to the 100 μm polishing will hereinafter be referred to as the measurement sample A. The unpolished surface and the surface formed by polishing will hereinafter be referred to as the first and second surfaces, respectively. The first surface was an outside exposed surface and the second surface was a surface separated from the outside exposed surface by 100 μm or more.

Next, indium-gallium alloy electrodes were formed on the whole areas of both first and second surfaces.

R0 (Ω) is the resistance value measured by applying a pair of terminals of a resistance meter respectively to both electrodes on the front and back surfaces.

Ra (Ω) is the resistance value measured by the same manner as above (by forming electrodes on both front and back surfaces) after a 10 μm layer has been polished away from the first surface of the measurement sample A.

Rb (Ω) is the resistance value measured by the same manner as above (by forming electrodes on both front and back surfaces) after a 30 μm layer has been further polished away from the first surface of the measurement sample A (a 40 μm layer is polished away in total from the first surface).

Rc (Ω) is the resistance value measured by the same manner as above (by forming electrodes on both front and back surfaces) after a 20 μm layer has been further polished away from the first surface of the measurement sample A (a 60 μm layer is polished away in total from the first surface).

Rd (Ω) is the resistance value measured by the same manner as above (by forming electrodes on both front and back surfaces) after a 20 μm layer has been further polished away from the first surface of the measurement sample A (a 80 μm layer is polished away in total from the first surface).

Re (Ω) is the resistance value measured by the same manner as above (by forming electrodes on both front and back surfaces) after a 30 μm layer has been further polished away from the first surface of the measurement sample A (a 110 μm layer is polished away in total from the first surface).

Rf (Ω) is the resistance value measured by the same manner as above (by forming electrodes on both front and back surfaces) after a 20 μm layer has been further polished away from the first surface of the measurement sample A (a 130 μm layer is polished away in total from the first surface).

Rg (Ω) is the resistance value measured by the same manner as above (by forming electrodes on both front and back surfaces) after a 40 μm layer has been further polished away from the first surface of the measurement sample A (a 170 μm layer is polished away in total from the first surface).

By using the above Ra to Rg, the resistivity values at predetermined locations along the depth direction of the sintered body were derived as follows:

$$\rho 5 = (R0 - Ra) \times 7.5^2 \times \pi / 10 \ (\Omega m)$$

$$\rho 25 = (Ra - Rb) \times 7.5^2 \times \pi / 30 \ (\Omega m)$$

$$\rho 50 = (Rb - Rc) \times 7.5^2 \times \pi / 20 \ (\Omega m)$$

$$\rho 70 = (Rc - Rd) \times 7.5^2 \times \pi / 20 \ (\Omega m)$$

$$\rho 95 = (Rd - Re) \times 7.5^2 \times \pi / 30 \ (\Omega m)$$

$$\rho 120 = (Re - Rf) \times 7.5^2 \times \pi / 20 \ (\Omega m)$$

$$\rho 150 = (Rf - Rg) \times 7.5^2 \times \pi / 40 \ (\Omega m)$$

Additionally, R50 (Ω) is defined as a resistance value obtained as follows: After a 50 μm layer was polished away from a first surface of the measurement sample B formed of a 10 mm×10 mm×10 mm (a cube) sintered body described above, an electrode was formed on the whole area of a second surface opposite to the first surface, and the resistance value R50 (Ω) was measured by contacting terminals of a resistance meter each having a contact area of 1 mm² respectively to the center of the polished surface and the center of the electrode. R200 (Ω) is defined as a resistance value obtained as follows: After a 150 μm layer was further polished away from the first surface (the total layer polished away was 200 μm), the resistance value R200 (Ω) was measured by contacting a terminal of a resistance meter having a contact area of 1 mm² directly to the polished surface and by contacting a terminal to an electrode formed on the other surface in a manner similar to the above.

Figure 3:
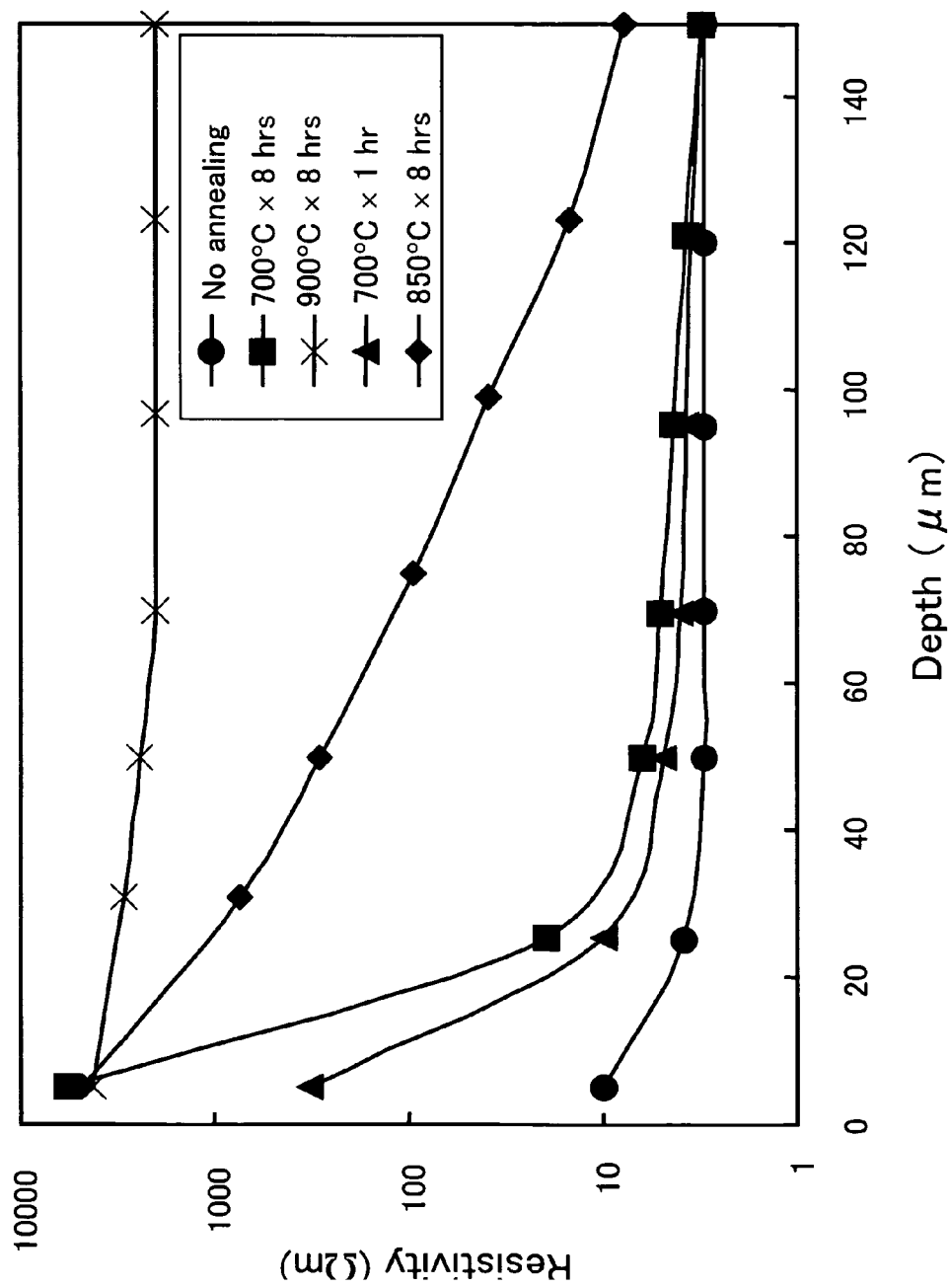
FIG. 3 is a graph showing the relation between the depth from the sample surface and the resistivity in Example 1.

The above described measurement results are shown in Table 1 and FIG. 3. In FIG. 3, for example, "5" of ρ5 means a depth.

As shown in Table 1 and FIG. 3, it can be seen that application of the annealing increases the resistance in the vicinity of the surface. The increasing degree of the resistance varies depending on the annealing treatment conditions. Under the weak oxidative conditions of 700° C.×1 hour, ρ5 increases up to only about 300 Ωm, while under the conditions of 700° C.×8 hours, ρ5 increases up to about 5800 Ωm. When the annealing temperature is raised up to 850° C. or 900° C., ρ5 does not further increase, but ρ50 increases. In particular, such a tendency is remarkable with the annealing treatment at 900° C.

The value of ρ5/ρ50 exhibits the largest value under the conditions of 700° C.×8 hours, revealing a sharp drop of the resistance. By contrast, under the conditions of 700° C.×1 hour leading to low ρ5 or under the conditions of 850° C.×8 hours or 900° C.×8 hours leading to high ρ5, the value of ρ5/ρ50 is small and the drop of the resistance can hardly be said as sharp. Under the conditions of 700° C.×8 hours, the value of R50/R200 is 10 or less, and moreover, 5 or less, suggesting sharp drop of the resistance.

TABLE 1

| Annealing conditions | ρ5 (Ωm) | ρ50 (Ωm) | ρ5/ρ50 | R50 (kΩ) | R200 (kΩ) | R50/R200 |
|---|---|---|---|---|---|---|
| No annealing | 10 | 3 | 3.3 | 3.42 | 3.39 | 1.01 |
| 700° C. × 1 hour | 323 | 5 | 64.6 | 4.85 | 3.42 | 1.42 |
| 700° C. × 8 hour | 5754 | 6.4 | 899.1 | 7.89 | 3.31 | 2.38 |
| 850° C. × 8 hour | 4735 | 285 | 16.6 | 285 | 7.8 | 36.54 |
| 900° C. × 8 hour | 4200 | 2454 | 1.7 | 2227 | 2158 | 1.03 |

By using the samples subjected to the annealing treatments under the respective conditions, the temperature properties of the core loss (Pcv), the withstand voltages, the direct current superposition properties (Idc), the saturation magnetic flux densities (Bs) and the initial permeabilities (μi) were measured. The results obtained are shown in Table 2 and FIGS. 4 to 6.

Figure 13:
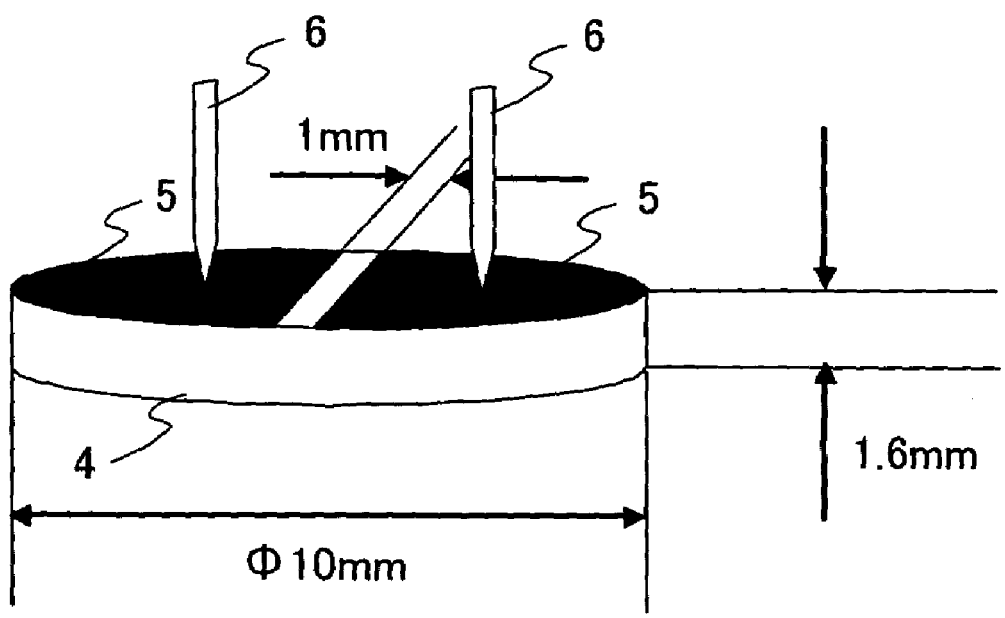
FIG. 13 is a diagram illustrates a method for measuring the withstand voltage.

As shown in FIG. 13, for the with stand voltage measurement, there were formed a pair of indium-gallium alloy half-moon electrodes 5 on one side surface of a sample 4 of φ10 mm and 1.6 mm (thickness). The pair of electrodes have a gap of 1 mm there between. A predetermined voltage was applied between the electrodes 5 through terminals 6 at 20° C. for 1 minute, and the maximum voltage which causes no current runaway was taken as the withstand voltage.

The direct current superposition property (Idc) was obtained as follows: a wire was wound around a 3.3 mm×3.3 mm×13 mm I-core until the inductance reached 20 μH, current was applied at room temperature (20° C.) or at 100° C., and the current at which the inductance was decreased by 10% was taken as the direct current superposition property (Idc). It may be noted that the inductance was measured at a frequency of 100 kHz.

TABLE 2

| Annealing conditions | Pcv (kW/m³) at 80° C. | Withstand voltage (V) | Idc (A) at 20° C. | Idc (A) at 100° C. | Bs (mT) | μi |
|---|---|---|---|---|---|---|
| No annealing | 343 | 10 | 8.6 | 7.2 | 546 | 2396 |
| 700° C. × 1 hour | 402 | 30 | 8.6 | 7.0 | 544 | 1810 |
| 700° C. × 8 hours | 482 | 90 | 8.6 | 6.7 | 538 | 1674 |
| 850° C. × 8 hours | 1634 | 84 | 8.3 | 6.4 | 534 | 1329 |
| 900° C. × 8 hours | 3187 | 80 | 8.0 | 6.2 | 531 | 1062 |
| Ni—Zn based ferrite | 3404 | >250 | 6.2 | 5.4 | 480 | 250 |

Figure 4:
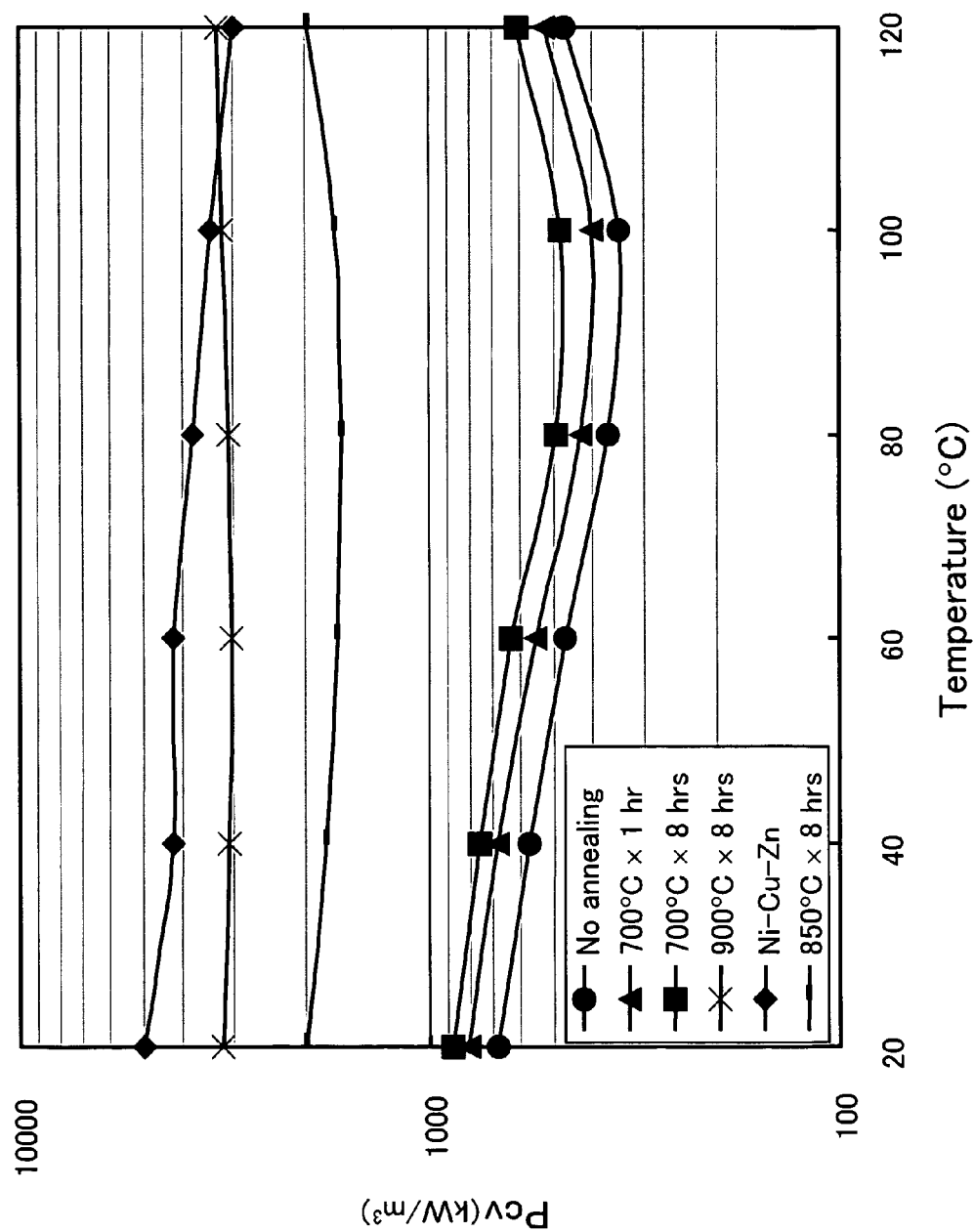
FIG. 4 is a graph showing the relation between the sample temperature and the core loss (Pcv) in Example 1.

As shown in Table 2 and FIG. 4, when the 700° C.×8 hours annealing treatment leading to high ρ5 and sharp resistance drop was applied, no drastic increase of the core loss (Pcv) was observed. However, when the 850° C.×8 hours or 900° C.×8 hours annealing treatment leading to high ρ5 and small ρ5/ρ50 was applied, the core loss (Pcv) was increased to be about 10 times as high as the core loss of a sample subjected to no annealing. The core loss (Pcv) measurement was made at 100 kHz and 200 mT with a toroidal core of 20 mm in outside diameter, 10 mm in inside diameter and 5 mm in thickness.

As shown in Table 2, when the 700° C.×8 hours, 850° C.×8 hours or 900° C.×8 hours annealing treatment leading to high ρ5 was applied, the with stand voltage was high; in these cases, the higher was ρ50, the lower was the withstand voltage.

Figure 5:
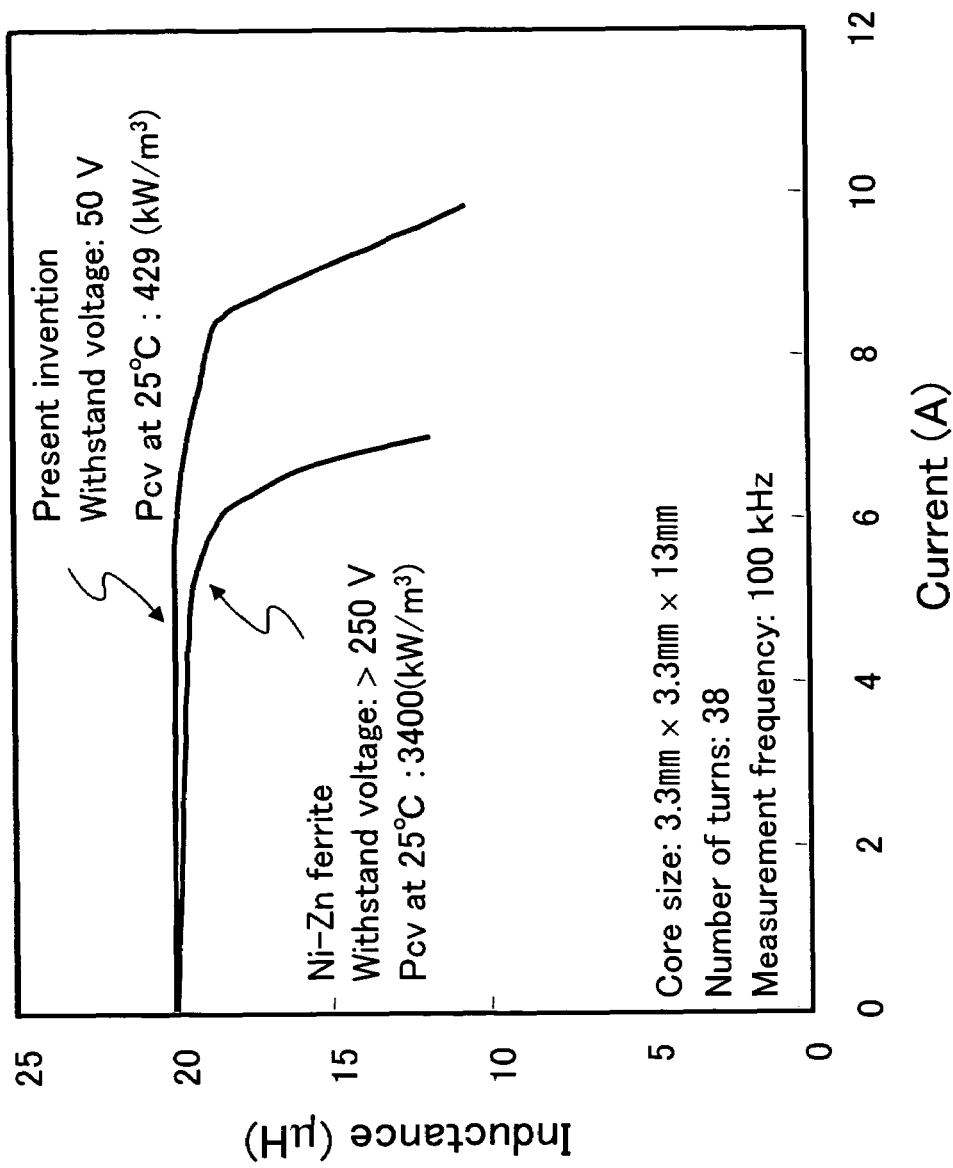
FIG. 5 is a graph showing the relation between the current and the inductance (direct current superposition property, 25° C.) in Example 1.
Figure 6:
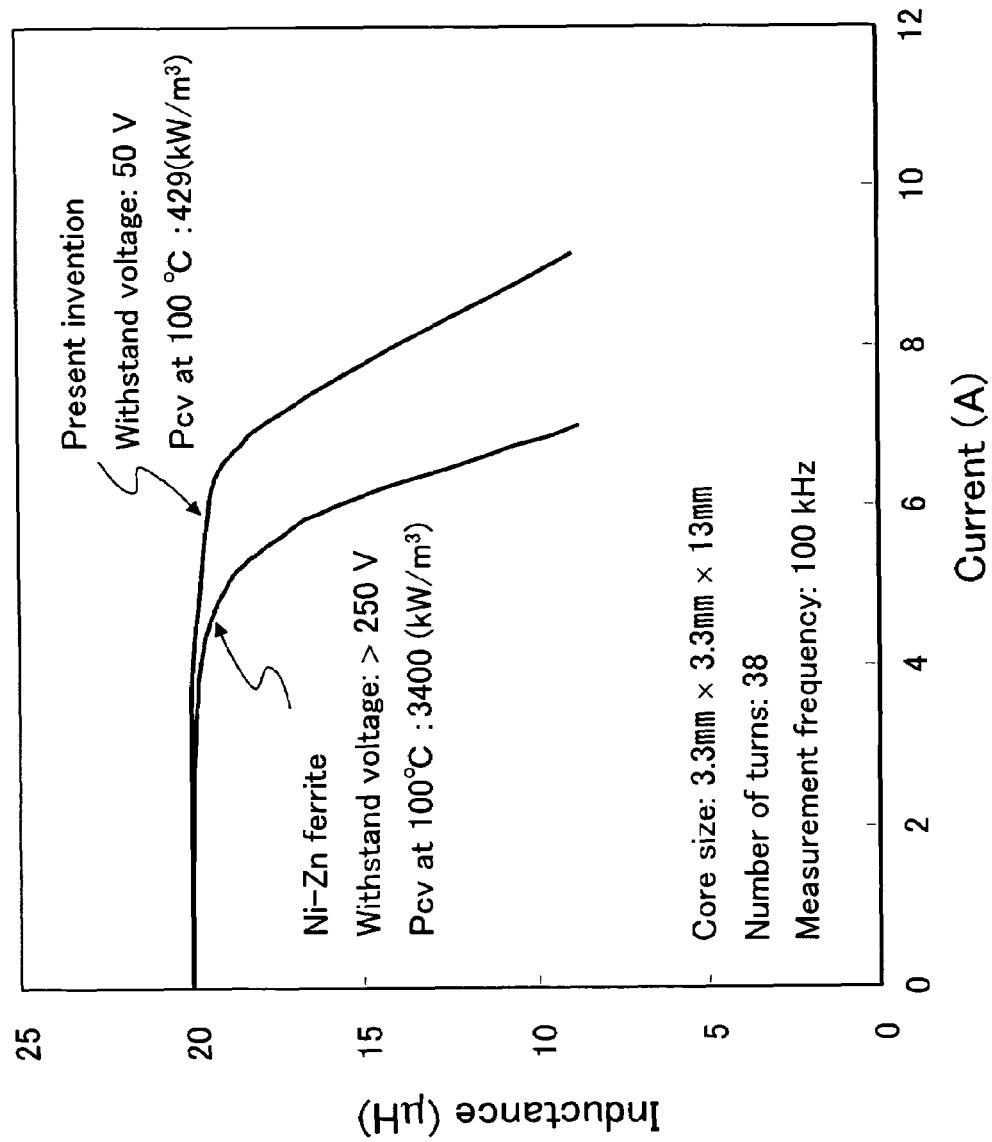
FIG. 6 is a graph showing the relation between the current and the inductance (direct current superposition property, 100° C.) in Example 1.

The direct current superposition property (Idc) was constant or scarcely varied under the conditions that only the surface resistance was increased, but was decreased when the internal resistance was increased. The initial permeability exhibited a similar tendency. FIGS. 5 and 6 show the direct current superposition properties at 25° C. and 100° C., respectively, for the sample subjected to the annealing treatment under the conditions of 700° C.×8 hours. FIGS. 5 and 6 also show the direct current superposition property of a core formed of a Ni—Zn based ferrite. As can be seen from FIGS. 5 and 6, the core of the present invention exhibits a more satisfactory direct current superposition property than the core formed of a Ni—Zn based ferrite.

EXAMPLE 2

Figure 7:
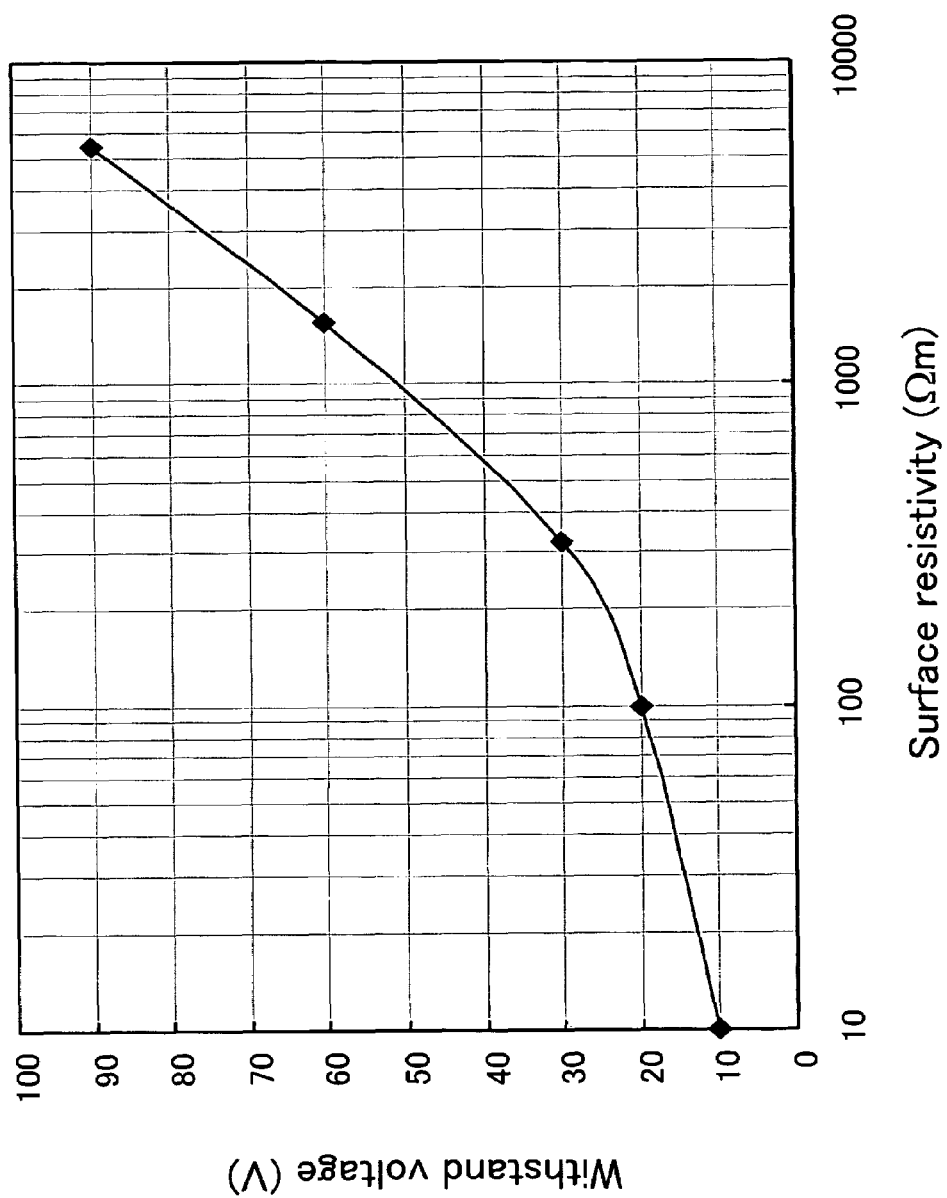
FIG. 7 is a graph showing the relation between ρ5 and the withstand voltage in Example 2.

Samples were prepared in the same manner as in Example 1 except that the annealing conditions were such that 600° C.×1 hour, 700° C.×1 hour, 700° C.×2 hours and 700° C.×8 hours, and the withstand voltage and ρ5 values thereof were measured. The results thus obtained are shown in Table 3 and FIG. 7. As can be seen from Table 3 and FIG. 7, when the extent of the oxidation based on the annealing treatment is increased, ρ5 is increased and the withstand voltage is improved. In particular, when ρ5 is made to be 1000 Ωm or more, a withstand voltage of 50 V or more can be obtained.

TABLE 3

| Annealing conditions | Withstand voltage (V) | ρ5 (Ωm) |
| --- | --- | --- |
| No annealing | 10 | 10 |
| 600° C. × 1 hour | 20 | 100 |
| 700° C. × 1 hour | 30 | 323 |
| 700° C. × 2 hours | 60 | 1560 |
| 700° C. × 8 hours | 90 | 5509 |

EXAMPLE 3

Figure 8:
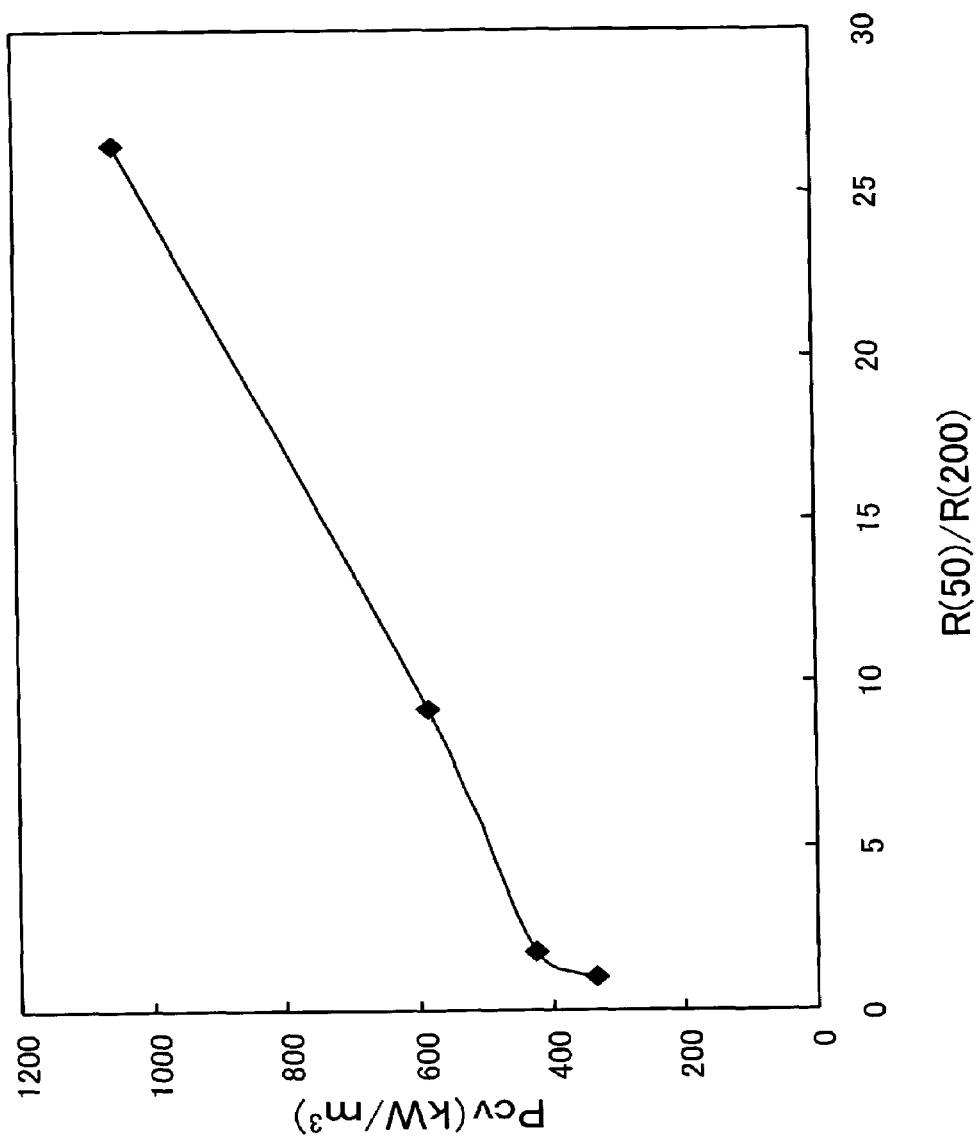
FIG. 8 is a graph showing the relation between R50/R200 and the core loss (Pcv) in Example 3.

Samples were prepared in the same manner as in Example 1 except that the annealing conditions were such that 700° C.×4 hours, 800° C.×4 hours and 850° C.×2 hours, and the core loss (Pcv) values and the above described R50 and R200 values thereof were measured. The results thus obtained are shown in Table 4 and FIG. 8. When R50≦10× R200, the core loss (Pcv) can be made to be 600 kW/m³ or less.

TABLE 4

| Annealing conditions | R50 (kΩ) | R200 (kΩ) | R50/R200 | Pcv (kW/m³) |
| --- | --- | --- | --- | --- |
| No annealing | 3.42 | 3.39 | 1.01 | 335 |
| 700° C. × 4 hours | 6.15 | 3.42 | 1.80 | 425 |
| 800° C. × 4 hours | 35.6 | 3.87 | 9.20 | 586 |
| 850° C. × 2 hours | 148 | 5.59 | 26.48 | 1050 |

EXAMPLE 4

Figure 9:
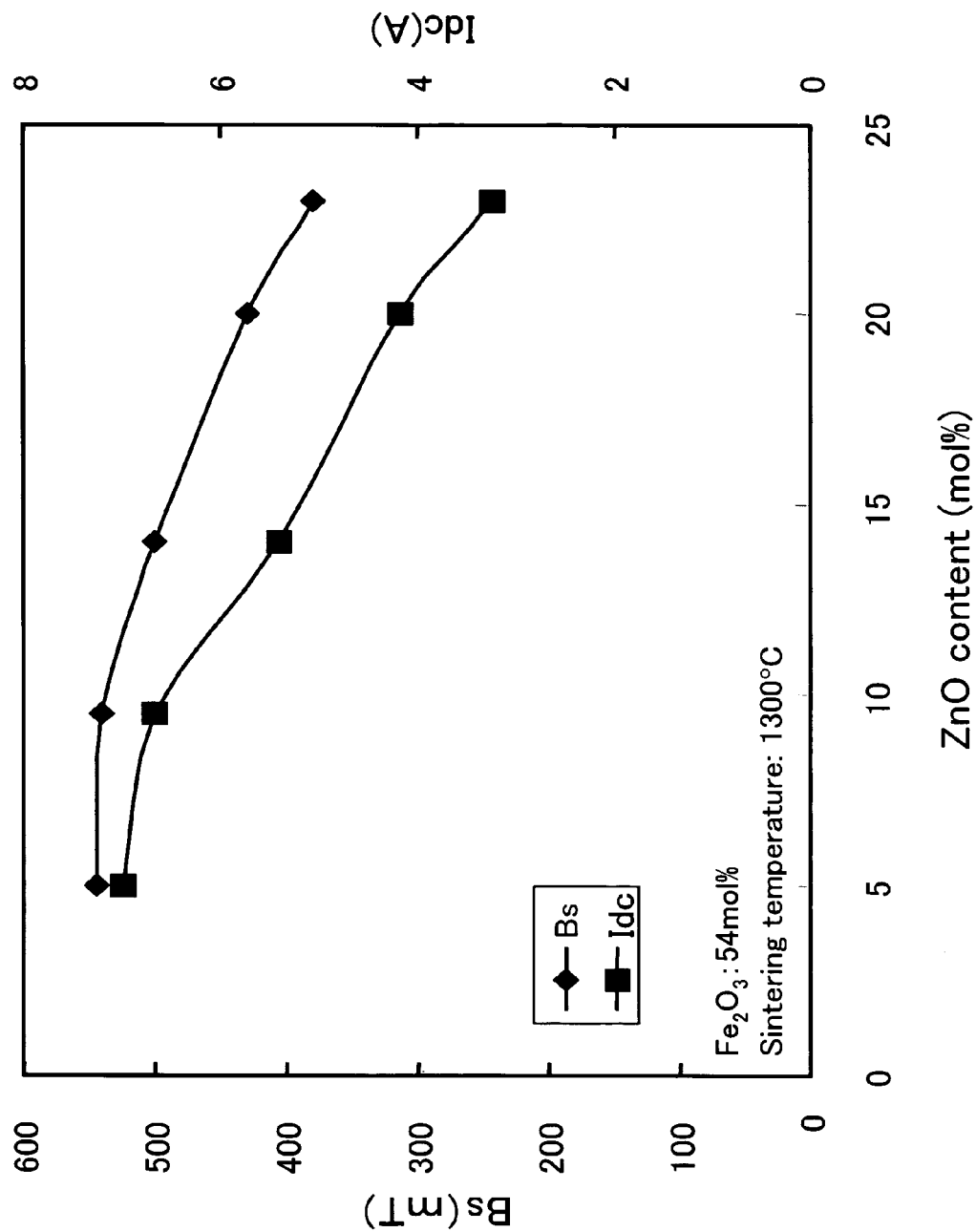
FIG. 9 is a graph showing the saturation magnetic flux density (Bs) and the direct current superposition property (Idc) as a function of the ZnO content in Example 4.

Samples were prepared in the same manner as in Example 1 except that $Fe_2O_3$ content was fixed at 54 mol %, the ZnO content was varied, sintering was carried out at 1300° C. and the 700° C. 8 hours annealing treatment was applied. The saturation magnetic flux density (Bs) and the direct current superposition property (Idc) at 100° C. of each of the samples were measured. The results obtained are shown in Table 5 and FIG. 9. With increasing ZnO content, the saturation magnetic flux density (Bs) the direct current superposition property (Idc) tend to be degraded; however, when the ZnO content falls within the range of 14% or less, the saturation magnetic flux density (Bs) of 500 mT or more and the direct current superposition property (Idc) of 5.4 A or more can be obtained.

TABLE 5

| ZnO content (mol %) | Bs (mT) | Idc (A) |
| --- | --- | --- |
| 5 | 545 | 7 |
| 9.5 | 540 | 6.67 |
| 14 | 500 | 5.4 |
| 20 | 430 | 4.18 |
| 23 | 380 | 3.23 |

EXAMPLE 5

Figure 10:
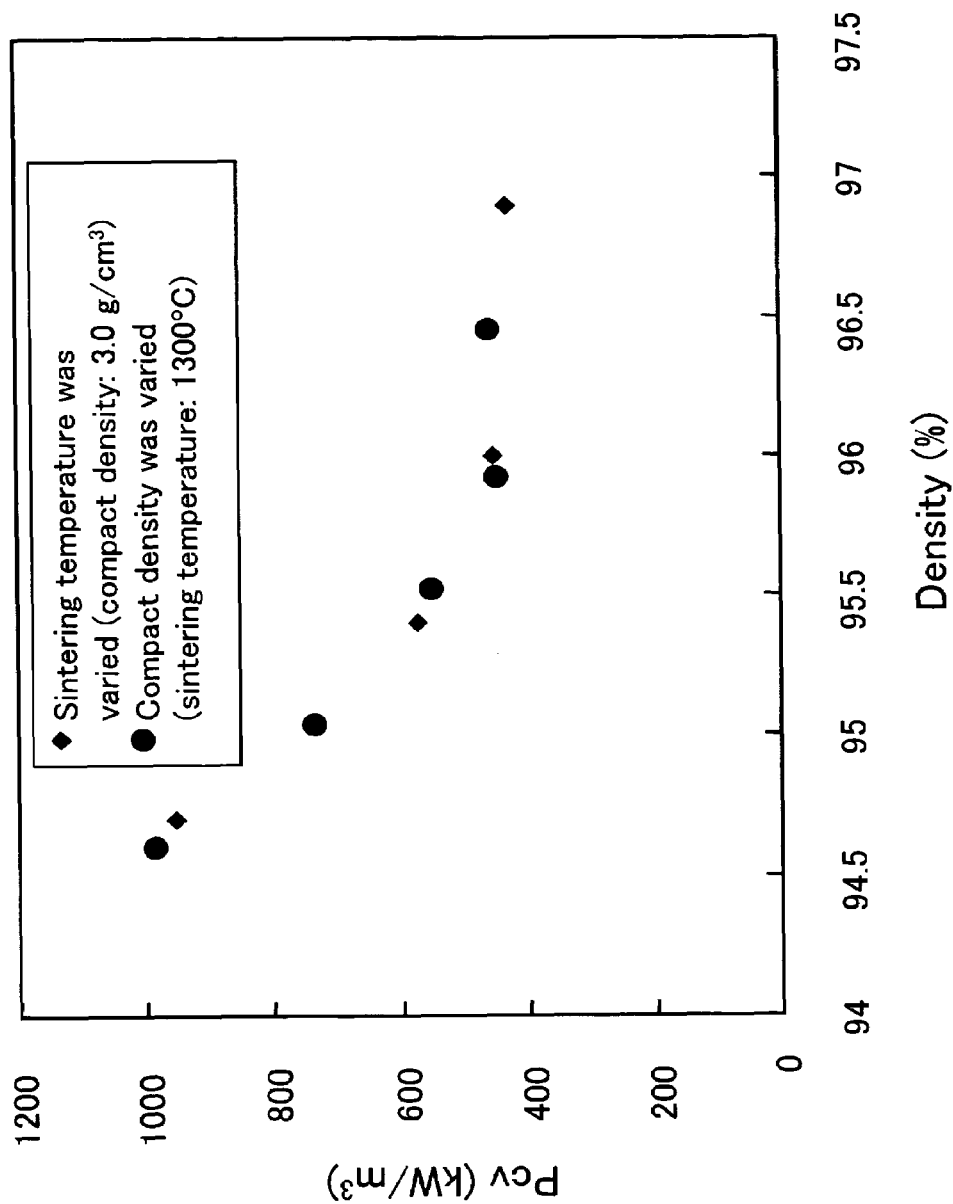
FIG. 10 is a graph showing the relation between the sintered body density and the core loss (Pcv) in Example 4.

Samples were prepared in the same manner as in Example 1 except that the compact density and the sintering temperature were varied as shown in Table 6, and the annealing treatment was carried out under the conditions of 700° C.×4 hours. The sintering densities and the core loss (Pcv) values of the samples were measured. The results obtained are shown in Table 6 and FIG. 10. When the sintered body density is 95.5% or more, the core loss (Pcv) can be made to be 600 kW/m³ or less. By contrast, when the sintered body density is as low as 94.7%, the core loss (Pcv) is large. This means that when the sintered body density is low, the annealing treatment makes the resistance high in the region from the surface to a deeper portion of the sintered body.

TABLE 6

| Sintered body density (%) | Sintering temperature (° C.) | Compact density (g/cm³) | Pcv (kW/m³) |
| --- | --- | --- | --- |
| 94.70 | 1220 | 3.05 | 953 |
| 95.40 | 1250 | 3.01 | 574 |
| 96.00 | 1280 | 3.02 | 450 |
| 96.90 | 1300 | 3.00 | 429 |
| 96.45 | 1300 | 2.91 | 457 |
| 95.92 | 1300 | 2.79 | 446 |
| 95.52 | 1300 | 2.71 | 552 |

TABLE 6-continued

| Sintered body density (%) | Sintering temperature (° C.) | Compact density (g/cm³) | Pcv (kW/m³) |
|---|---|---|---|
| 95.04 | 1300 | 2.60 | 734 |
| 94.60 | 1300 | 2.52 | 987 |

EXAMPLE 6

Figure 11:
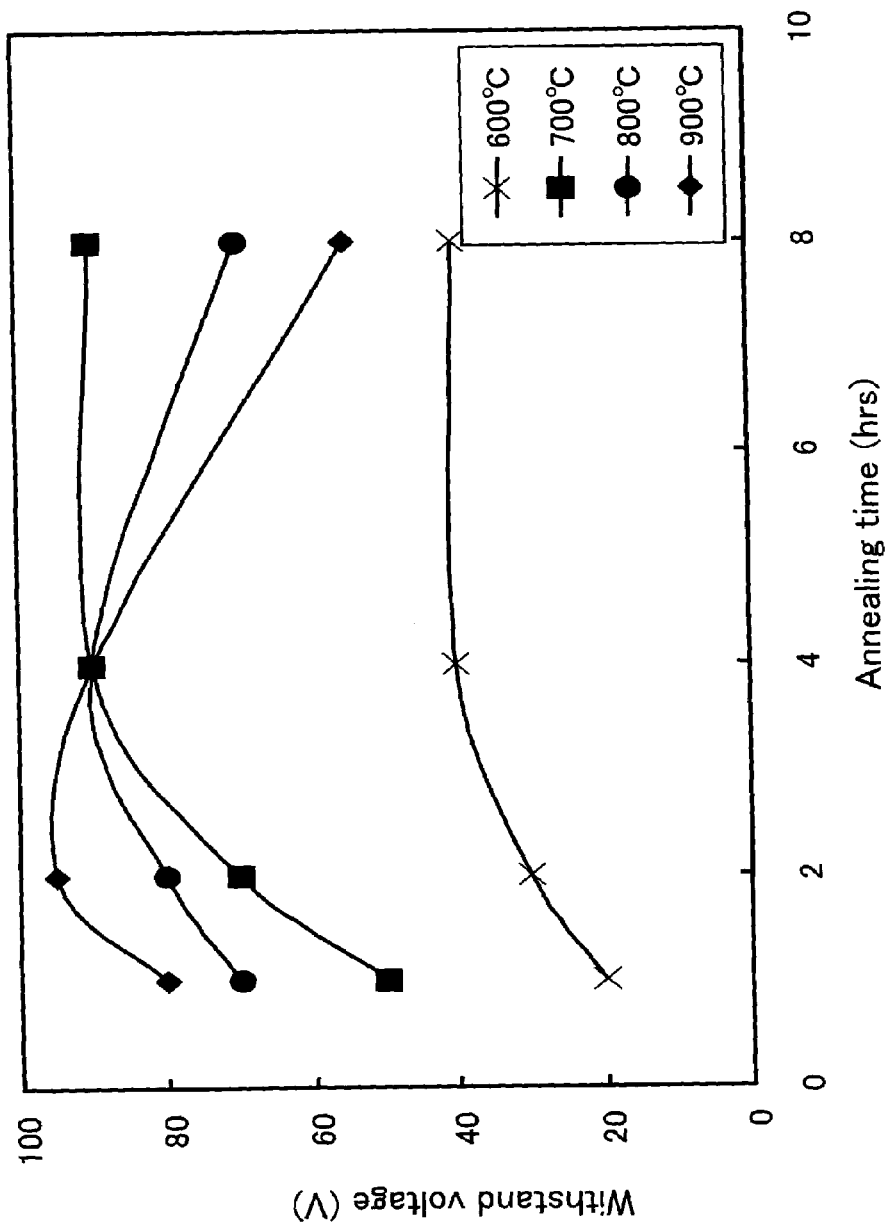
FIG. 11 is a graph showing the relation between the annealing time and the withstand voltage in Example 5.
Figure 12:
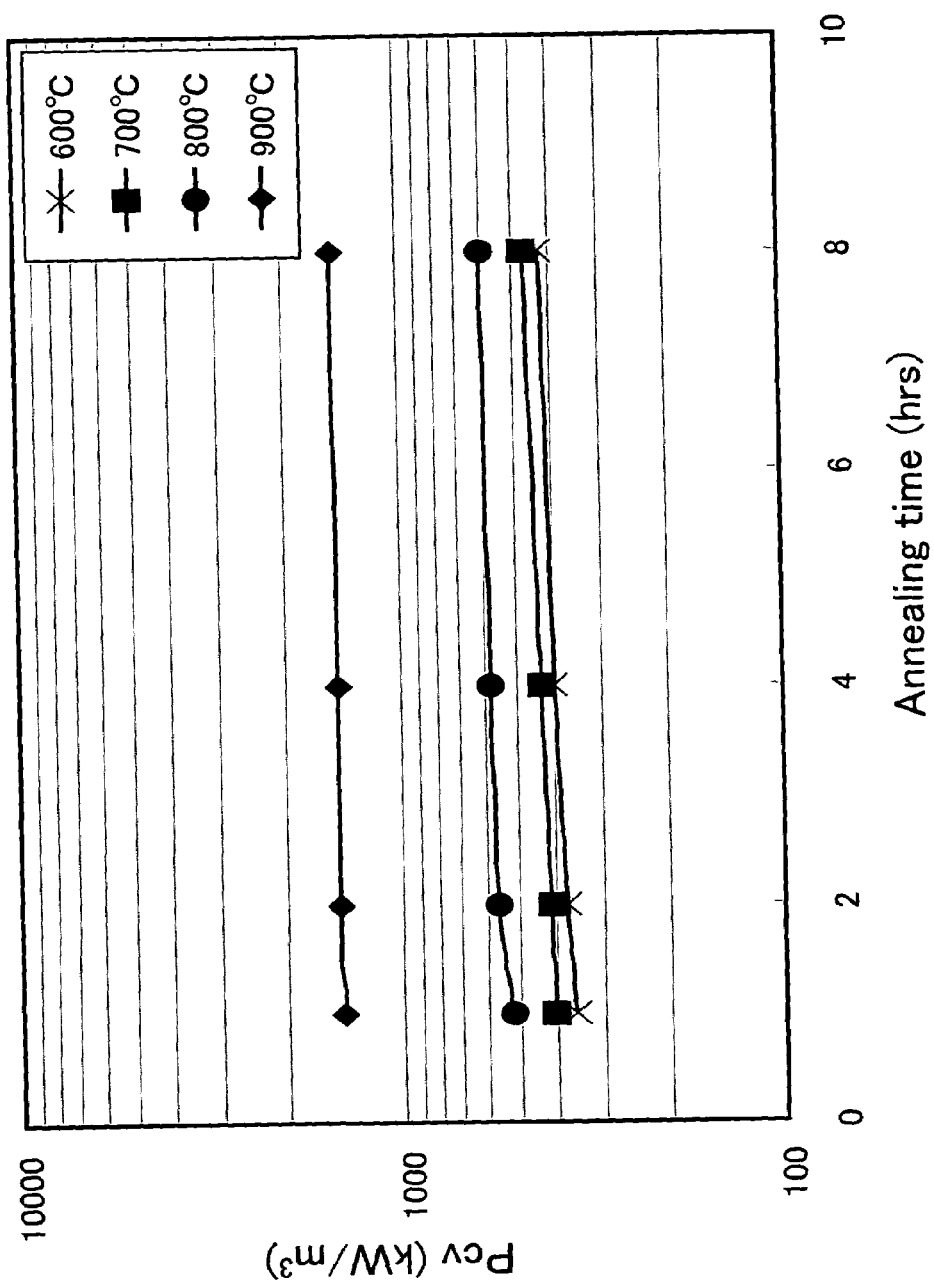
FIG. 12 is a graph showing the relation between the annealing time and the core loss (Pcv) in Example 5.

Samples were prepared in the same manner as in Example 1 except that the annealing temperature was set at 600, 700, 800 or 900° C., and the annealing time was set at 1, 2, 4 or 8 hours. The withstand voltage and core loss (Pcv) of each of the samples were measured to investigate the relation between these properties and the annealing treatment conditions. The results obtained are shown in FIGS. 11 and 12. As shown in FIGS. 11 and 12, the withstand voltage is 50 V or less for the annealing temperature of 600° C., and the withstand voltage is sufficiently large but the core loss (Pcv) is much larger than 600 kW/m³ for the annealing temperature of 900° C. Accordingly, it can be seen that the annealing temperature preferably falls within the range between 650 and 850° C.

What is claimed is:

1. A Mn—Zn based ferrite member comprising:
a magnetic body formed of a Mn—Zn based ferrite sintered body; and
a surface layer portion formed on the surface area of said magnetic body and having the properties that $\rho 5$ defined below satisfies the relation that $\rho 5 \geq 10^3$ Ωm and $\rho 50$ defined below satisfies the relation that $\rho 50 \leq 10^2$ Ωm, with the proviso that $\rho 5$: (R0−R1)S/L5 (ρm)

and $\rho 50$: (R2−R3)S/L50 (Ωm), wherein:

L5=10 μm;

L50 20 μm;

R0 (Ω) represents a resistance value between an electrode formed on the whole area of a first surface of a measurement sample A and an electrode formed on the whole area of a second surface thereof, the measurement sample A being taken from said Mn—Zn based ferrite member, having said first surface and said second surface that are parallel and opposed to each other, and forming a columnar body of a constant sectional area S (mm²) between said first surface and said second surface, with said first surface being an outside exposed surface of said Mn—Zn based ferrite member and said second surface being a surface separated by 100 μm or more from the outside exposed surface in said Mn—Zn based ferrite member);
R1 (Ω) represents a resistance value between an electrode formed on the whole area of a polished surface formed by polishing away a 10 μm layer from said first surface of said measurement sample A and said electrode formed on the whole area of said second surface;
R2 (Ω) represents a resistance value between an electrode formed on the whole area of a polished surface formed by polishing away a 40 μm layer from said first surface of said measurement sample A and said electrode formed on the whole area of said second surface; and
R3 (Ω) represents a resistance value between an electrode formed on the whole area of a polished surface formed by polishing away a 60 μm layer from said first surface of said measurement sample A and said electrode formed on the whole area of said second surface.

2. The Mn—Zn based ferrite member according to claim 1, wherein:

$\rho 5 \geq 300 \times \rho 50$.

3. The Mn—Zn based ferrite member according to claim 1, wherein:

$\rho 5 \geq 2 \times 10^3$ Ωm;

$\rho 50 \leq 0.5 \times 10^2$ Ωm; and $\rho 5 \geq 500 \times \rho 50$.

4. The Mn—Zn based ferrite member according to claim 1, wherein:
R50 and R200 both defined below are such that the relations, R50≦15 kΩ and R50<10×R200, are satisfied.
A measurement sample B is a cubic sample, measuring 10 mm×10 mm×10 mm and taken from said Mn—Zn based ferrite member;
R50 represents a resistance value measured by contacting terminals each having a contact area of 1 mm² provided at the center of a polished surface formed by polishing away a 50 μm layer from a first surface of said measurement sample B and the center of an electrode, and said electrode being formed on the whole area of a second surface opposite to said first surface, wherein said first surface in said measurement sample B is the outside exposed surface in said Mn—Zn based ferrite member; and
R200 represents a resistance value measured by contacting terminals each having a contact area of 1 mm² provided at the center of a polished surface formed by polishing away a 200 μm layer from said first surface and the center of an electrode, and said electrode being formed on the whole area of said second surface opposite to said first surface.

5. The Mn—Zn based ferrite member according to claim 1 or claim 4, wherein:
said Mn—Zn based ferrite sintered body comprises ZnO in a range of 14 mol % or less.

6. The Mn—Zn based ferrite member according to claim 1 or claim 4, wherein:
said Mn—Zn based ferrite sintered body comprises as main constituents, 50 to 58 mol % of $Fe_2O_3$, 5 to 14 mol % of ZnO, and the balance being substantially MnO.

7. The Mn—Zn based ferrite member according to claim 1, wherein:
said Mn—Zn based ferrite sintered body has a relative density of 96% or more.

* * * * *